UNITED STATES PATENT OFFICE.

FRANKLIN A. HUTTON, OF WASHINGTON, DISTRICT OF COLUMBIA.

IMPROVED EMBALMING-FLUID.

Specification forming part of Letters Patent No. 38,747, dated June 2, 1863.

*To all whom it may concern:*

Be it known that I, FRANKLIN AUGUSTUS HUTTON, M. D., of Washington city, District of Columbia, have invented and discovered a Fluid (a new compound) for Embalming the Dead; and I do hereby declare that the following is a full and exact description thereof.

The nature of my invention is a fluid mixture of ingredients which I inject into the arteries.

I prepare the compound and mixture as follows: In six pounds of muriatic acid I dissolve four pounds of zinc. After the zinc is dissolved in the acid I add one gallon of alcohol, two drams of arsenic, and one dram of corrosive sublimate. When the ingredients have become thoroughly mixed I warm the fluid and inject it while warm into the arteries.

I am aware that a fluid has been made of other ingredients and used for the purpose of embalming the dead; but from years of practice I am satisfied that I have attained superior advantages, and that my mixture produces the proper effects and results. My invention hardens the body, as it crystallizes in the arteries, and does not discolor the skin. It produces a white marble color, free from blotches, while the countenance assumes a calm and natural appearance, as if asleep, and the body is thus preserved for many years.

What I claim as my invention, and desire to secure by Letters Patent, is—

The ingredients mixed in the manner and in the quantities as herein described as a fluid for the purpose of embalming the dead.

F. A. HUTTON.

Witnesses:
J. FRANKLIN REIGART,
JOHN S. HOLLINGSHEAD.